United States Patent [19]
Draghetti

[11] Patent Number: 6,092,641
[45] Date of Patent: Jul. 25, 2000

[54] METHOD AND DEVICE FOR VERTICALLY CONVEYING PACKETS OF CIGARETTES

[75] Inventor: Fiorenzo Draghetti, Medicina, Italy

[73] Assignee: G.D Societa' Per Azioni, Bologna, Italy

[21] Appl. No.: 08/878,975

[22] Filed: Jun. 19, 1997

[30] Foreign Application Priority Data

Jun. 21, 1996 [IT] Italy ............................. BO96A00344

[51] Int. Cl.[7] .................................................. B65G 47/24
[52] U.S. Cl. ...................... 198/406; 198/417; 198/467.1; 198/724; 198/778
[58] Field of Search .................................. 198/406, 408, 198/417, 467.1, 657, 778, 724

[56] References Cited

U.S. PATENT DOCUMENTS

| | | | |
|---|---|---|---|
| 2,628,708 | 2/1953 | Wahl et al. | 198/724 |
| 2,854,125 | 9/1958 | Johnson | 198/467.1 |
| 3,495,291 | 2/1970 | Copping et al. | 198/417 |
| 5,291,987 | 3/1994 | Zink | 198/724 |
| 5,765,675 | 6/1998 | Draghetti et al. | 198/417 |
| 5,810,151 | 12/1996 | Catelli et al. | 198/417 |

FOREIGN PATENT DOCUMENTS

| | | |
|---|---|---|
| 1085465 | 7/1960 | Germany . |
| 758000 | 9/1956 | United Kingdom . |
| 794253 | 4/1958 | United Kingdom . |
| 797685 | 7/1958 | United Kingdom . |

*Primary Examiner*—Joseph E. Valenza
*Attorney, Agent, or Firm*—Marshall, O'Toole, Gerstein, Murray & Borun

[57] ABSTRACT

A method and device for vertically conveying packets of cigarettes, whereby packets of cigarettes, fed successively to an input of a guide, are transferred to an output of the guide by means of a screw lifting member rotating about a respective axis; the output being at a different level from that of the input, and the guide extending by a given angle about the axis of the screw lifting member.

18 Claims, 6 Drawing Sheets

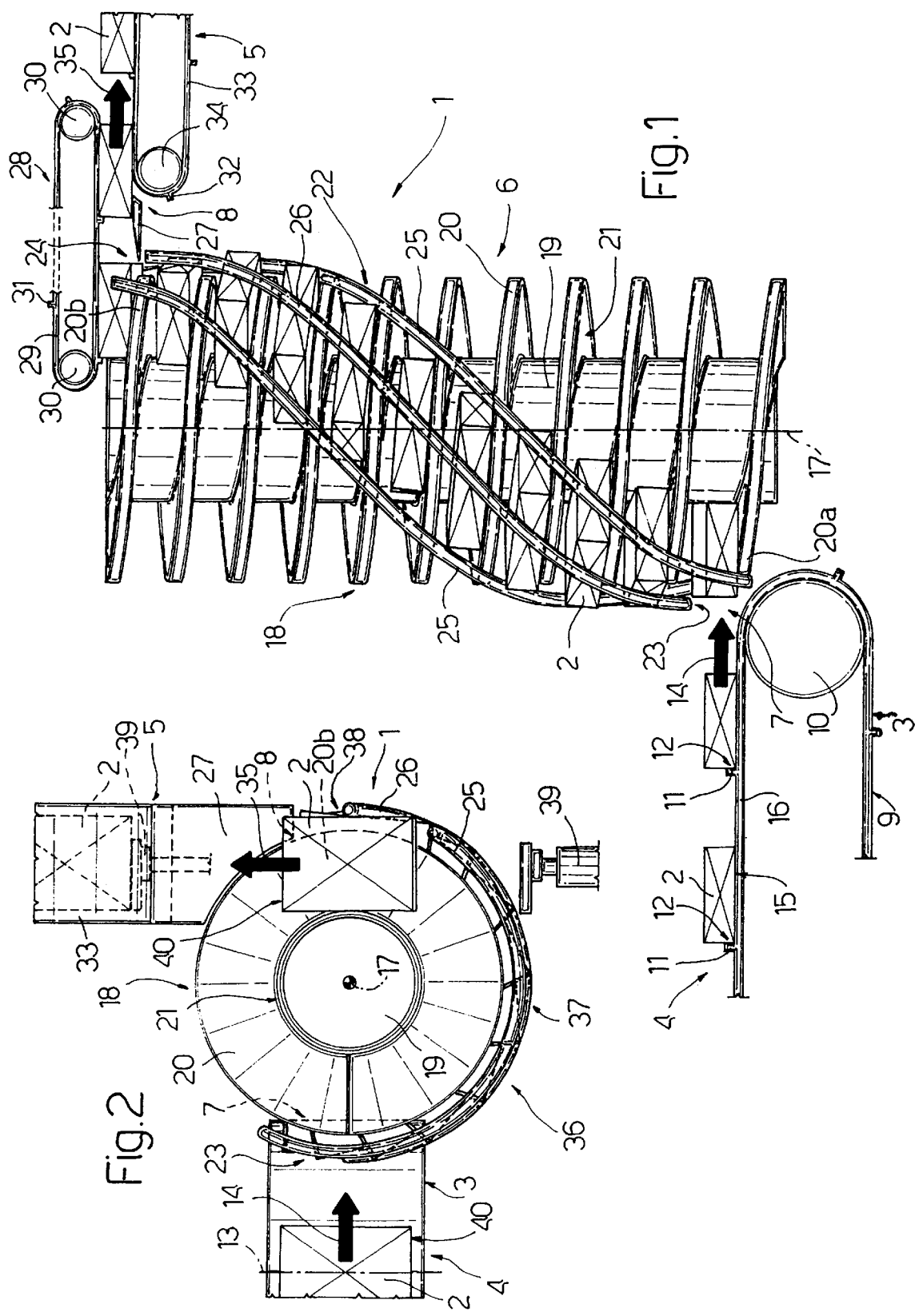

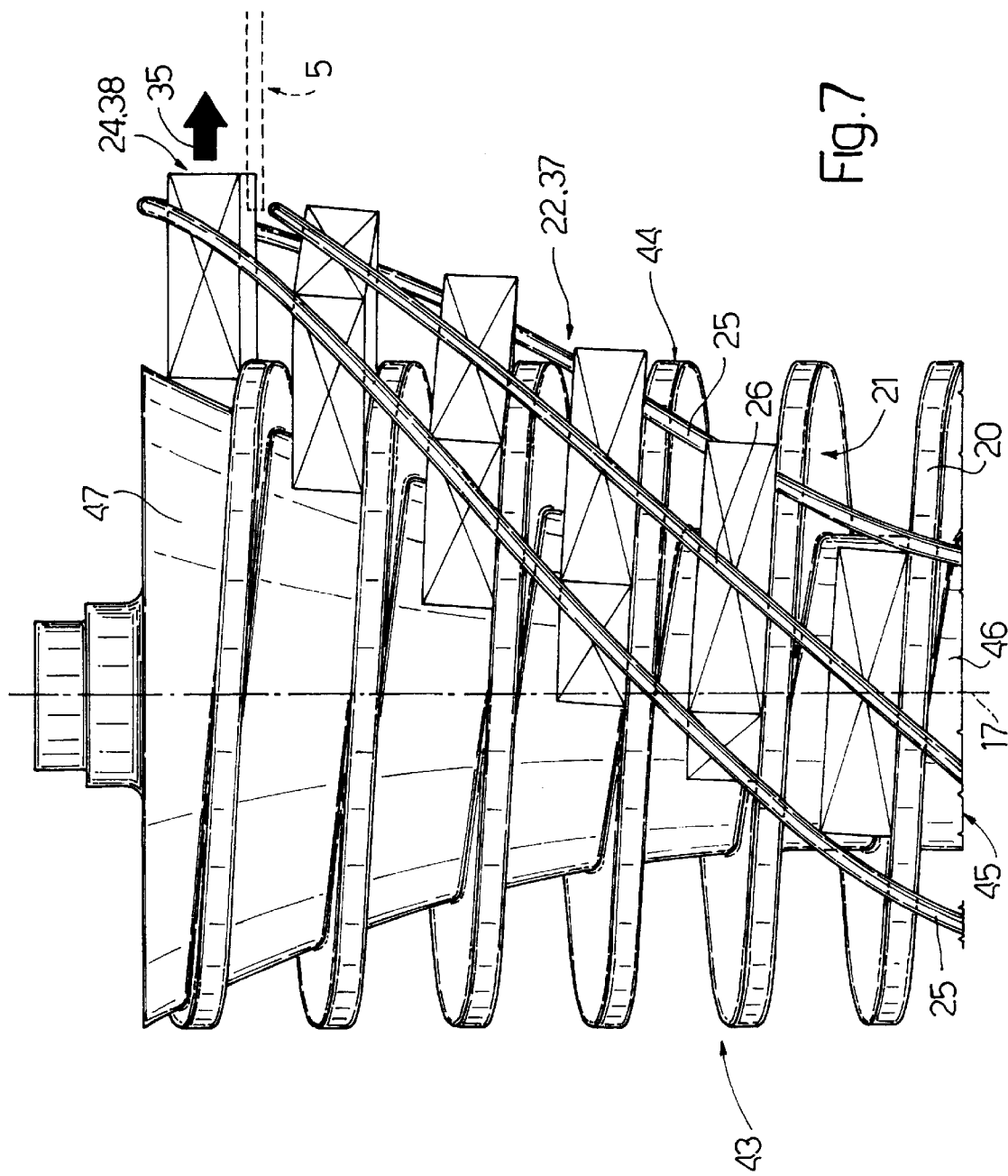

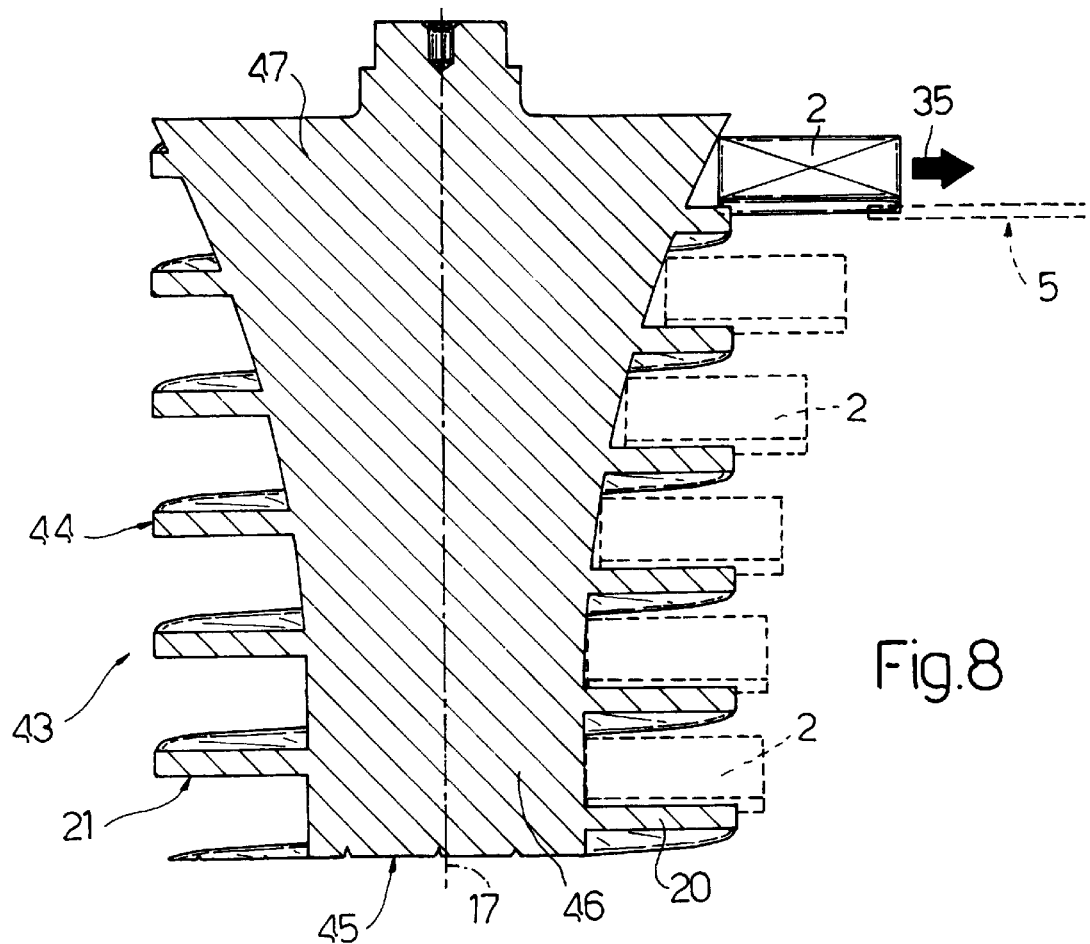
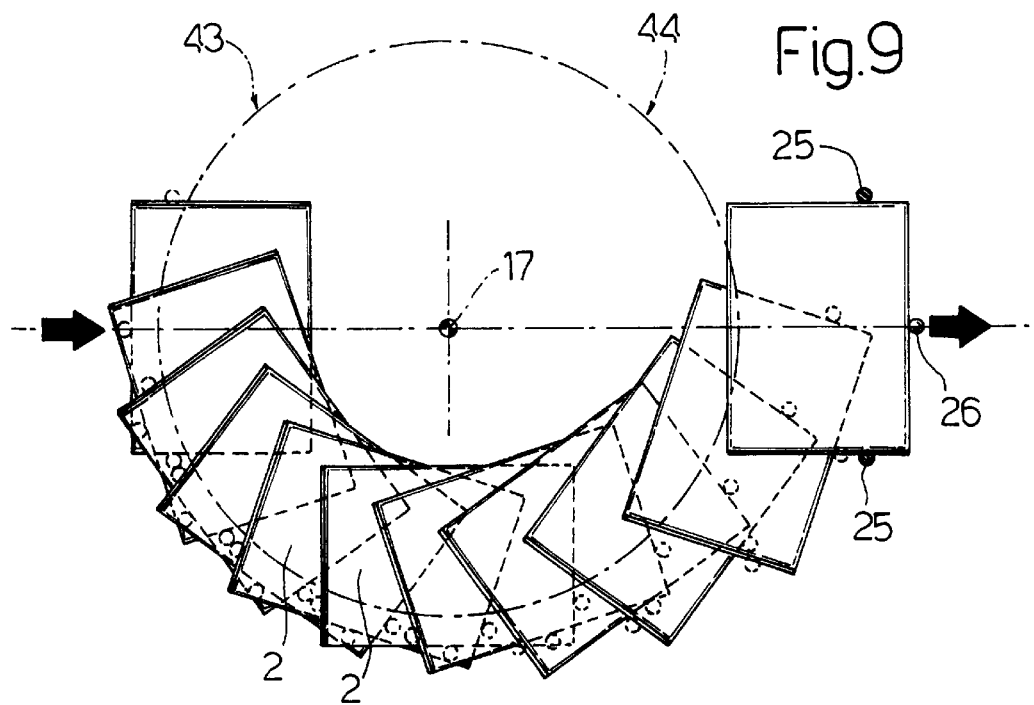

METHOD AND DEVICE FOR VERTICALLY CONVEYING PACKETS OF CIGARETTES

BACKGROUND OF THE INVENTION

The present invention relates to a method of vertically conveying packets of cigarettes.

Here and hereinafter, "vertically" is intended to mean any movement comprising an upward or downward component.

The present invention may be used to advantage for transferring packets of cigarettes from the output of a cellophaning machine to the input of a cartoning machine, to which the following description refers purely by way of example.

In cigarette packing systems comprising a cellophaning machine and a cartoning machine connected in series, the packets of cigarettes are fed from the output of the cellophaning machine to the input of the cartoning machine along a path comprising a normally upward change in level.

In known systems, the change from one level to the other is normally made by means of a stacking device, which normally comprises a reciprocating pusher for successively receiving the packets at the output end of a normally horizontal path, and for pushing them successively into a vertical conduit inside which a stack is formed. On emerging from the top end of the conduit, the top packet in the stack is removed by a second pusher, which feeds the packets successively on to a normally horizontal conveyor.

The above method involves several drawbacks, foremost of which are the necessity of feeding the packets in steps to the input of the conduit, and the rigidity of the system, which does not allow the output direction of the packets from the vertical conduit to be adapted to any arrangement of the cartoning machine with respect to the cellophaning machine.

The first of the above drawbacks has been eliminated using counter-rotating screw lifting devices by which the packets are fed successively between two screws separated by such a distance as to engage the opposite ends of the packets, which are lifted by the two screws along a vertical guide interposed between the screws.

Though the above method does allow, if necessary, for continuously feeding the packets to and through the lifting device, the structure of the device is such that the change in level is made by feeding the packets parallel to themselves at all times. As a result, throughout their upward movement, the packets maintain the same orientation, which cannot be adapted as a function of the position of the cartoning machine with respect to the output of the cellophaning machine.

SUMMARY OF THE INVENTION

It is an object of the present invention to provide a method of vertically conveying packets of cigarettes, designed to overcome the aforementioned drawback.

According to the present invention, there is provided a method of vertically conveying packets of cigarettes, the method comprising the steps of feeding packets of cigarettes successively to a guide via input conveying means traveling in a first direction, the guide comprising an input for the packets communicating with the input conveying means, and an output for the packets, said input and said output being located at different levels; transferring the packets successively from said input to said output via screw lifting means; and unloading the packets successively from said output via output conveying means traveling in a second direction; the method being characterized in that said screw lifting means comprise a single screw lifting member rotated about a respective axis to feed the packets along the guide, which extends by a given angle about said axis.

The present invention also relates to a device for vertically conveying packets of cigarettes.

According to the present invention, there is provided a device for vertically conveying packets of cigarettes, the device comprising a guide, in turn comprising an input for the packets and an output for the packets, said input and said output being located at different levels; input conveying means for successively feeding the packets to said input in a first given direction; screw lifting means for successively transferring the packets from said input to said output; and output conveying means for successively unloading the packets from said output in a second direction; the device being characterized in that said screw lifting means comprise a single screw lifting member rotating about a respective axis; the guide extending by a given angle about said axis.

BRIEF DESCRIPTION OF THE DRAWINGS

A number of non-limiting embodiments of the present invention will be described by way of example with reference to the accompanying drawings, in which:

FIG. 1 shows a schematic side view, with parts removed for clarity, of a first preferred embodiment of the conveying device according to the present invention;

FIG. 2 shows a schematic plan view of a first variation of a detail in FIG. 1;

FIG. 7 shows a partial side view of a third embodiment of the conveying device according to the present invention;

FIG. 8 shows an axial section of a detail in FIG. 7.

FIG. 9 shows a plan view of the operation of the FIG. 7 device.

DETAILED DESCRIPTION OF THE INVENTION

Figure 3:
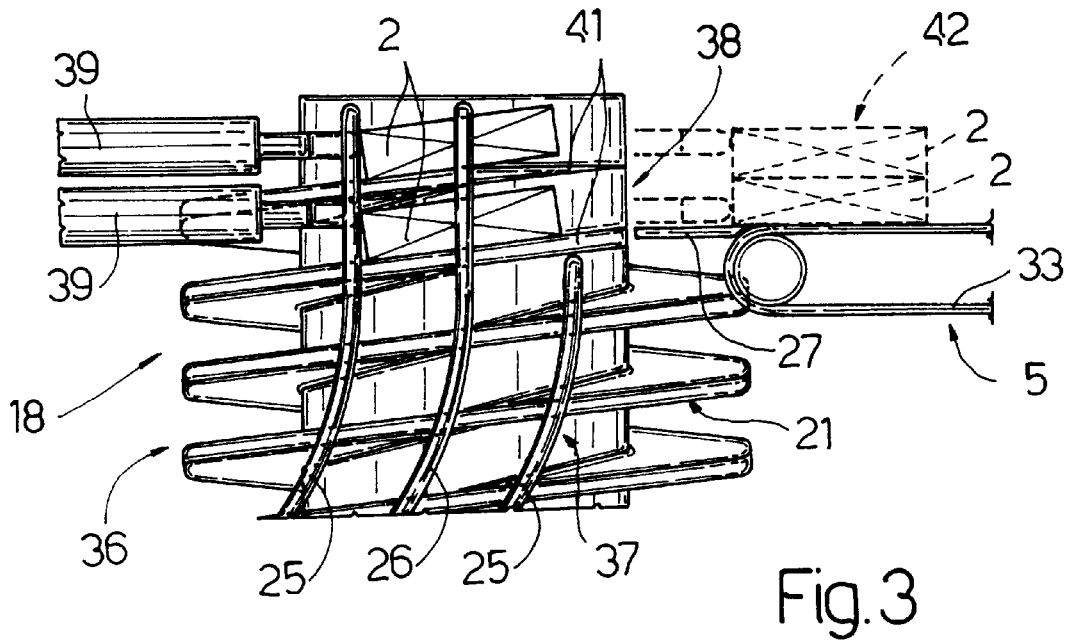
FIG. 3 shows a side view of a second variation of a detail in FIG. 1.

Number 1 in FIG. 1 indicates a conveying device for conveying packets 2 of cigarettes. Device 1 comprises an input conveyor 3 comprising, in the example shown, an output conveyor belt of a cellophaning machine 4; an output conveyor 5 comprising an overhead conveyor belt at a higher level than conveyor 3 and for transferring packets 2 to the input of a known cartoning machine (not shown); and a lifting device 6 interposed between the output 7 of conveyor 3 and the input 8 of conveyor 5, and for imparting to packets 2 a movement having a vertical component, and such as to transfer packets 2 from the level of conveyor 3 to the level of conveyor 5.

Conveyor 3 comprises a belt 9 looped about two pulleys 10 (only one shown), one of which is a drive pulley for moving belt 9 in steps or continuously. Belt 9 comprises a number of outer projections 11 equally spaced along belt 9 to define a succession of pockets 12, each for receiving a respective packet 2 positioned, in the example shown, with its longitudinal axis 13 (FIG. 2) crosswise to the traveling direction 14 of belt 9, and with a large lateral surface 15 contacting the substantially horizontal upper conveying branch 16 of belt 9.

Lifting device 6 extends along a substantially vertical axis 17, and comprises a screw 18 rotated at substantially constant speed about axis 17 by a known motor (not shown). Screw 18 comprises a cylindrical inner core 19 coaxial with axis 17 and having at least one helical outer thread defined by a substantially flat strip 20 winding about core 19 and defining, with core 19, an outwardly-open helical channel 21 of a height approximately equal to but no less than the thickness of packet 2 measured perpendicularly to branch 16 of belt 9 on conveyor 3, and a depth, measured radially with respect to core 19, less than the width of packet 2 measured parallel to direction 14 on conveyor 3.

More specifically, in a first angular position of screw 18 about axis 17, a first portion of strip 20—hereinafter referred to as "loading portion 20*a*"—is positioned coplanar with and facing output 7 of conveyor 3; and, in a second angular position, which, as in the example shown, may even coincide with the first, a second portion of strip 20—hereinafter referred to as "unloading portion 20*b*"—is positioned coplanar with input 8 of conveyor 5.

Again with reference to FIG. 1, in addition to screw 18, lifting device 6 also comprises a fixed guide 22 extending by a given angle about screw 18 and axis 17, and having an input 23 and an output 24, which are respectively located facing output 7 of conveyor 3 and input 8 of conveyor 5, and respectively enable packet 2 to be fed into and out of guide 22. Guide 22 is defined by two lateral bars 25 substantially tangent to the outer surface of screw 18 and separated by a distance approximately equal to but no less than the dimension of packet 2 measured crosswise to direction 14 and parallel to the surface of branch 16 on conveyor 3, and by an intermediate bar 26 located between bars 25 and at a distance from the outer surface of core 19 approximately equal to but no less than the dimension of packet 2 measured parallel to direction 14 on conveyor 3. Whereas bars 25 extend beyond input 23 and output 24 of guide 22, bar 26 extends between a point just over input 23, so as to define the upper limit of input 23, and a point just below output 24, so as to define the lower limit of output 24.

As shown in FIG. 1, unloading portion 20*b* is located at the top end of screw 18, and is alignable with a plate 27 extending just over the top end of intermediate bar 26 to connect output 24 of guide 22 to input 8 of conveyor 5. Plate 27 extends beneath a conveyor 28 located radially with respect to axis 17 and comprising a belt 29 looped about two pulleys 30, one of which is powered. Belt 29 comprises a number of projections 31 equally spaced along belt 29 with the same spacing as corresponding projections 32 along a belt 33 looped about pulleys 34 (only one shown, and one of which is powered) and defining conveyor 5. More specifically, an input portion of conveyor 28 extends over the top of core 19 and strip 20, and an output portion of conveyor 28 extends over input 8.

In actual use, conveyor 3 is so timed in relation to screw 18 as to feed a packet 2 through input 23 into channel 21 each time loading portion 20*a* travels past input 23. As soon as packet 2 is fed into channel 21 and arrested against the outer surface of core 19, the next turn of screw 18 feeds packet 2 upwards and on to the inside of intermediate bar 26; and, as screw 18 is rotated further, packet 2 is slid along strip 20 and along guide 22 to output 24.

Each packet 2 reaches unloading portion 20*b* in time with a corresponding projection 31, which, traveling outwards of channel 21 in a substantially radial direction with respect to axis 17, feeds packet 2 outwards of strip 20 and on to plate 27 and the input of conveyor 5, a projection 32 of which engages and feeds packet 2 in the traveling direction 35 of belt 33.

In connection with the above, it should be pointed out that, whereas, in the FIG. 1 example, guide 22 extends about screw 18 and axis 17 by an angle of substantially 180°, and directions 14 and 35 are parallel to each other, guide 22 may obviously extend about axis 17 by any angle between 0° and 360°, so that directions 14 and 35 may form any angle between 0° and 180°. In other words, lifting device 6 provides for successively transferring packets 2 between two conveyors 3 and 5 at different levels and so oriented as to form any angle between 0° and 180°, thus eliminating any problems as regards the layout of the system.

A further point to note is that lifting device 6 provides for rotating each packet 2 by 180° about an axis perpendicular to surface 15. As shown in FIG. 1, in fact, the rear surface, in direction 14, of packet 2 on conveyor 3 is positioned frontwards as packet 2 travels in direction 35 along conveyor 5.

The FIG. 2 variation shows how to effect a 90° variation in the orientation of packets 2, regardless of the angle by which guide 22 extends about screw 18. FIG. 2 shows a lifting device 36, which is interposed between two conveyors 3 and 5 respectively located radially and tangentially with respect to core 19 of screw 18, and comprises a, guide 37 with an input 23 identical to input 23 of guide 22 of lifting device 6, and an output 38, which differs from output 24 in that the bar 25 (not shown) facing input 8 of conveyor 5 is the same length as bar 26 of guide 22, and the other bar 25 and bar 26 are the same length as bars 25 of guide 22. In lifting device 36, conveyor 28 is replaced by a pusher 39 aligned with the traveling direction 35 of conveyor 5, and which provides for successively engaging packets 2 at output 38 and transferring them on to conveyor 5, on which packets 2 travel with a surface 40, formerly parallel to direction 14 on conveyor 3, facing forwards.

According to a variation not shown, the change in orientation effected by lifting device 36 may be achieved with conveyor 3 located tangentially and conveyor 5 radially, in which case, output 24 remains unchanged and input 23 is modified as for output 38.

Figure 4:
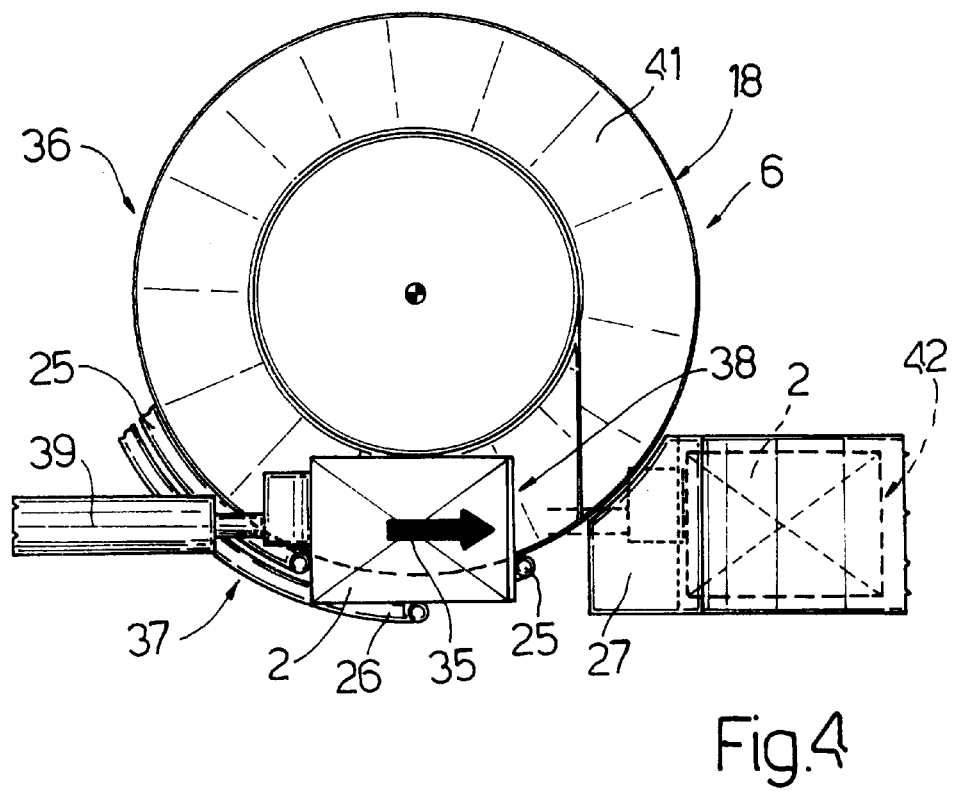
FIG. 4 shows a plan view of the FIG. 3 variation.

According to a further variation not shown, to prevent packets 2 from being rolled over by 90° or 180° as they are transferred from conveyor 3 to conveyor 5, both conveyors need simply be located tangentially with respect to core 19. In the FIGS. 3 and 4 variation, the bar 25 facing input 8 of conveyor 5 is shortened even further to expose a given number (two in the example shown) of successive turns 41 of channel 21, each exposed turn 41 is provided with a respective tangential pusher 39, and conveyor 5 is moved to a level just beneath the resulting output 38, so that, as opposed to a succession of packets 2, a succession of stacks 42 of packets 2 is formed on conveyor 5, each stack containing a number of superimposed packets 2 equal to the number of turns 41 exposed by the shortened bar 25. This solution is especially advantageous for forming cartons comprising a number of side by side stacks 42.

In all the above embodiments, screw 18 may be replaced by a screw 43, as shown in FIGS. 7 to 9. Screw 43 is defined externally by a cylindrical surface 44, and comprises a core 45, which in turn comprises a cylindrical bottom portion 46 supporting a strip 20 of constant width defining, together with portion 46, a channel 21 of substantially constant depth (measured radially with respect to portion 46), and a substantially truncated-cone-shaped top portion 47 increasing in diameter upwards and supporting a strip 20 gradually decreasing in width and defining, with portion 47, a channel 21 decreasing in depth upwards towards output 24 or 38.

Similarly, bars 25 and 26 are adapted to the variation in the diameter of core 45, and are maintained at a constant distance from the outer surface of core 45. As shown clearly in FIGS. 8 and 9, screw 43 provides for gradually expelling packets 2 radially from channel 21 as packets 2 travel long guide 22 or 37 to output 23 or 38.

Figure 5:
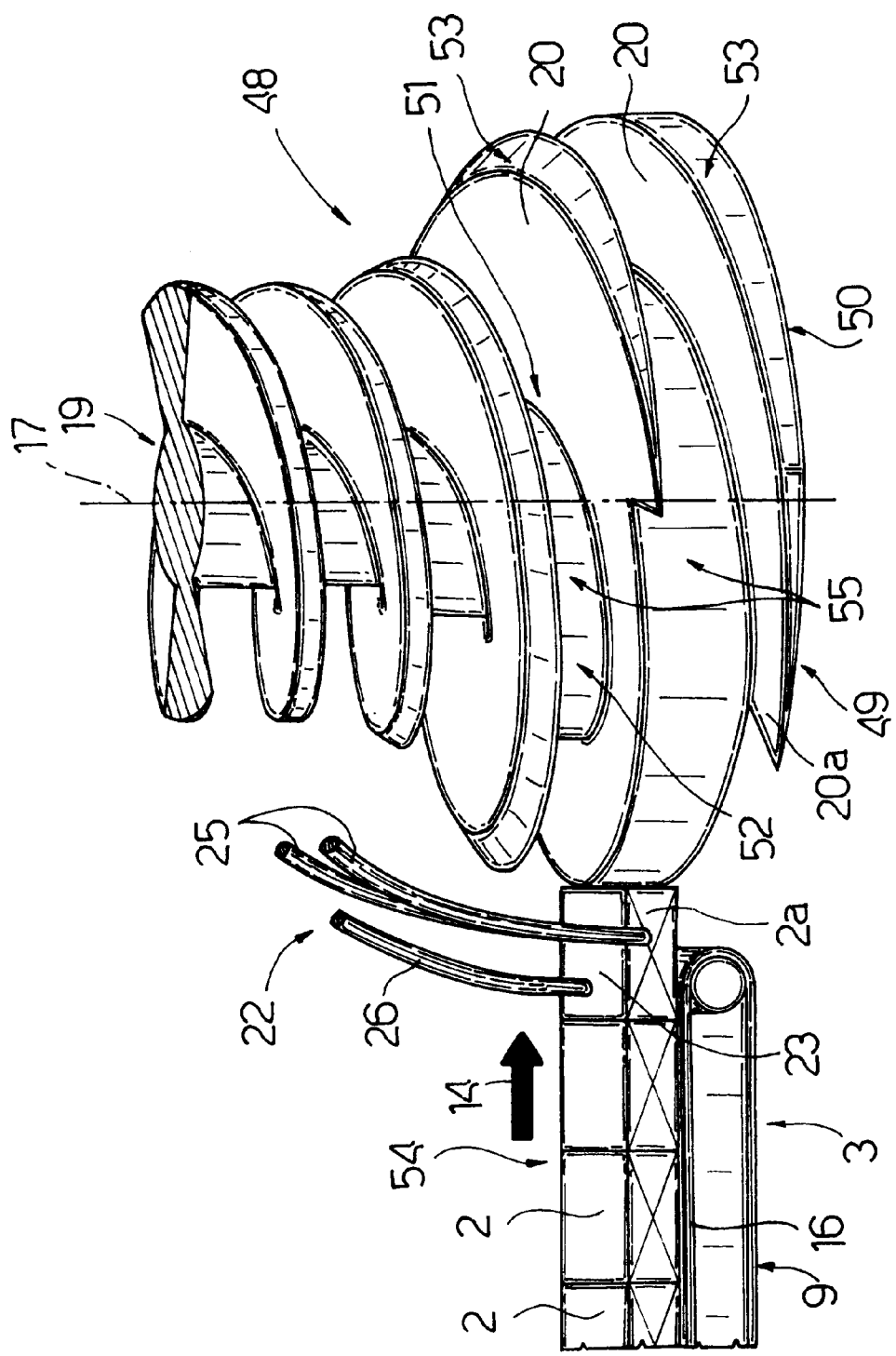
FIG. 5 shows a partial side view of a second embodiment of the conveying device according to the present invention.
Figure 6:
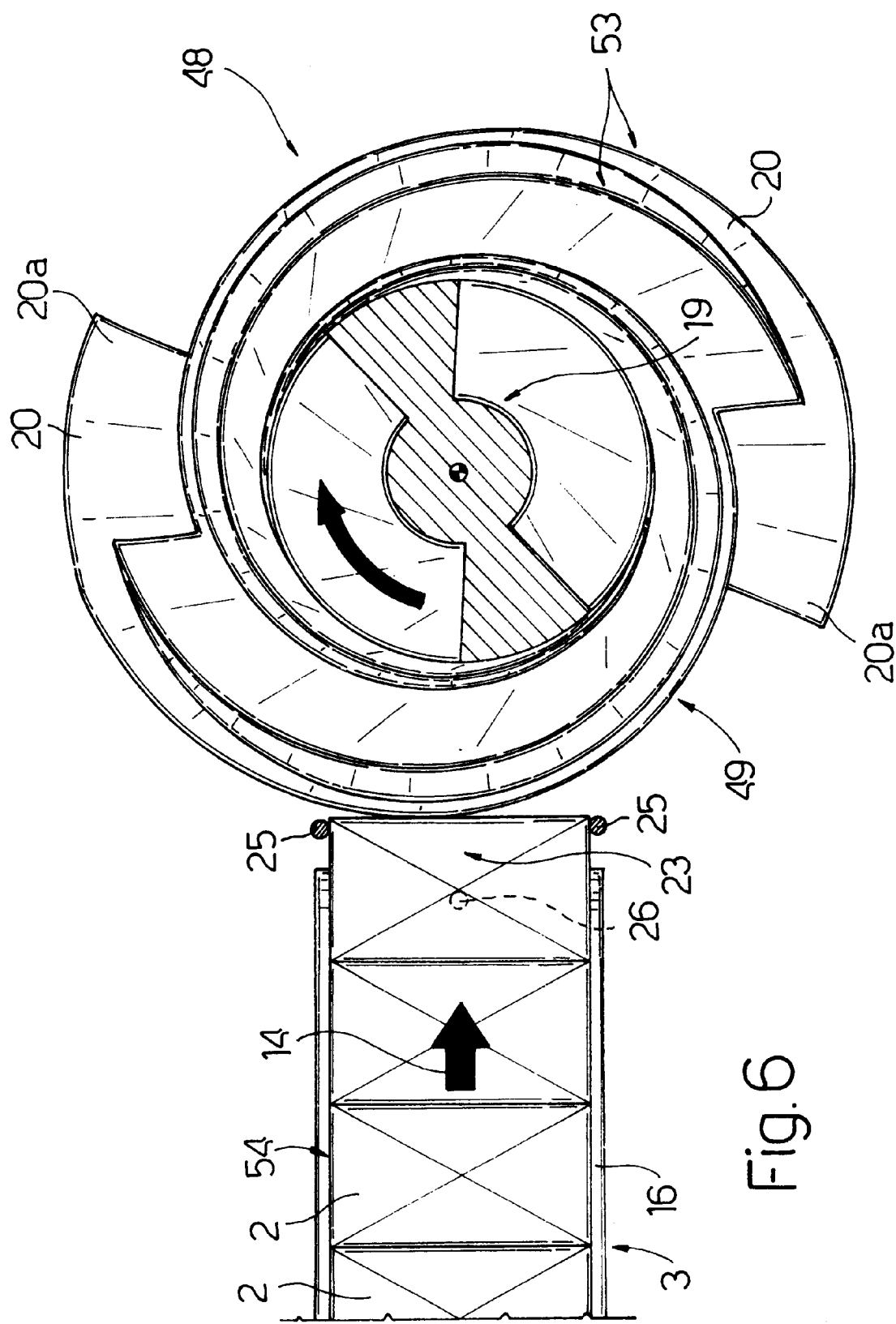
FIG. 6 shows a plan view of the FIG. 5 device.

In all the above embodiments, screw 18 or 43 may be replaced by a screw 48, as shown in FIGS. 5 and 6. Screw 48 comprises a bottom portion 49 defined by a flat bottom surface 50 coplanar with upper branch 16 of conveyor 3, by a bottom portion 51 of core 19 having a substantially truncated-cone-shaped outer surface 52 tapering upwards, and by two strips 20 of constant width, which are defined outwardly by a surface 53 substantially parallel to surface 52.

Screw 48 is connected to an input conveyor 3, which, unlike conveyor 3 connected to screw 18, has no projections 11 and provides for supplying a succession 54 of packets 2 arranged contacting one another; and guide 22 is maintained at a substantially constant distance from surface 53.

Surface 53 is designed according to the traveling speed of conveyor 3 and the angular speed of screw 48, so that, at input 23, the radius of the strips 55 of surface 53 on a level with output 7 of conveyor 3 varies, as screw 48 rotates about axis 17, at a speed equal to the traveling speed of conveyor 3 in direction 14. Consequently, as loading portion 20a of strip 20 of screw 48—which rotates clockwise in FIG. 5—moves beneath the first packet in succession 54—hereinafter referred to as packet 2a—positioned contacting strip 55 at input 23 of guide 22, packet 2a is raised along guide 22 and, at the same time, continues traveling in direction 14 without arresting succession 54, which continues traveling smoothly at constant speed in direction 14. As packet 2a is raised above the level of succession, 54, the next packet 2 is positioned contacting strip 55 pending the arrival of loading portion 20a.

As shown in FIG. 6, screw 48, like any of the screws described, is a multi-start—in the example shown, a double-start—screw to enable higher output speeds than those achievable using single-start screws.

I claim:

1. A method of vertically conveying packets (2) of cigarettes, the method comprising the steps of;

feeding packets (2) of cigarettes successively to a guide (22) via input conveying means (3) traveling in a first direction (14), the guide (22) comprising an input (23) for the packets (2) communicating with the input conveying means (3), and an output (24) for the packets (2), said input (23) and said output (24) being located at different vertical levels;

transferring the packets (2) successively from said input (23) to said output (24) via screw lifting means (6; 36); and unloading the packets (2) successively from said output (24) via output conveying means (5) traveling in a second direction (35); wherein said screw lifting means (6; 36) comprise a single screw lifting member (18) comprising an inner core (19) and rotating about a respective axis (17) to feed the packets (2) along the guide (22), which extends by a given angle about said axis (17) and comprising at least two first bars (25) extending substantially tangent to said outer portion of said screw lifting member (18), and a second bar (26) vertically extending between said two first bars (25), said two first bars (25) having lower ends below the input (23) and said second bar (26) having a lower end above the input (23);

said packet (2) having lateral sides and being fed radially to said inner core at said input (23) with the packet lateral sides engaging said two first bars (25) and said second bar (26) limiting radially outward movement of said packets.

2. A method as claimed in claim 1, wherein at least one of said directions (14, 35) is radial with respect to said axis (17).

3. A method as claimed in claim 1, characterized in that at least one of said directions (14, 35) is substantially tangential to said screw lifting member (18; 43; 48).

4. A method as claimed in claim 1, characterized in that both said directions (14, 35) are radial with respect to said axis (17); the packets (2) being fed in said first direction (14) with a first orientation, and in said second direction (35) with a second orientation opposite the first.

5. A method as claimed in claim 1, characterized in that one of said directions (14, 35) is radial with respect to said axis (17) and the other substantially tangential to said screw lifting member (18; 43; 48); the packets (2) being fed in said first direction (14) with a first orientation, and in said second direction (35) with a second orientation rotated 90° with respect to the first orientation.

6. A method as claimed in claim 1, wherein said screw lifting member (18; 48) comprises at least an outer helical channel (21) along which said packets (2) are fed by the packets (2) simultaneously engaging said channel (21) and said guide (22); the packets (2) being extracted from said channel (21) at said output (24) via extracting means (28; 39).

7. A method as claimed in claim 1, characterized in that said screw lifting member (43) comprises at least an outer helical channel (21) along which said packets (2) are fed by the packets (2) simultaneously engaging said channel (21) and said guide (22); the channel (21) having a given depth, and the packets (2) being extracted from said channel (21) at said output (24) by gradually reducing said depth.

8. A method as claimed in claim 1, characterized in that said screw lifting member (48) comprises at least an outer helical channel (21) along which said packets (2) are fed by the packets (2) simultaneously engaging said channel (21) and said guide (22); said input conveying means (3) traveling at a given speed; said channel (21) comprising an input portion located at said input (23) and having an end surface (55) winding about said axis (17); and said screw lifting member (48) being rotated about said axis (17) at such a speed as to move said end surface (55) away from said input (23) in said first direction (14) and a speed equal to said given speed.

9. A device for vertically conveying packets (2) of cigarettes, the device comprising:

a guide (22), in turn comprising an input (23) for the packets (2) and an output (24) for the packets (2), said input (23) and said output (24) being located at different vertical levels;

input conveying means (3) for successively feeding the packets (2) to said input (23) in a first given direction (14);

screw lifting means (6; 36) for successively transferring the packets (2) from said input (23) to said output (24); and output conveying means (5) for successively unloading the packets (2) from said output (24) in a second direction (35); wherein said screw lifting means (6; 36) comprise a single screw lifting member (18) comprising an inner core (19) and rotating about a respective axis (17); the guide (22) extending by a given angle about said axis (17) and comprising at least two first bars (25) extending substantially tangent to the outer portion of said screw lifting member (18), and a second bar (26) vertically extending between said two first bars (25), said two first bars (25) having lower ends below the input (23) and said second bar (26) having a lower end above the input (23);

said packet (2) having lateral sides and being fed radially to said inner core at said input (23) with the packet lateral sides engaging said two first bars (25) and said second bar (26) limiting radially outward movement of said packets.

10. A device as claimed in claim 9, wherein at least one of said directions (14, 35) is radial with respect to said axis (17).

11. A device as claimed in claim 9, characterized in that at least one of said directions (14, 35) is substantially tangential to said screw lifting member (18; 43; 48).

12. A device as claimed in claim 9, characterized in that both said directions (14, 35) are radial with respect to said axis (17).

13. A device as claimed in claim 9, characterized in that one of said directions (14, 35) is radial with respect to said axis (17) and the other substantially tangential to said screw lifting member (18; 43; 48).

14. A device as claimed in claim 9, wherein said screw lifting member (18; 43; 48) comprises a screw (18; 43; 48) rotating about a respective axis (17); the screw (18; 43; 48) comprising a core (19) coaxial with said axis (17), and at least a thread (20) winding about the core (19), and defining, with the core (19), at least a channel (21) for receiving said packets (2); and said guide (22) being engaged by a portion of each packet (2) projecting outwards of said channel (21).

15. A device as claimed in claim 14, wherein said channel (21) is of substantially constant depth between said input (23) and said output (24).

16. A device as claimed in claim 14, characterized in that at least an output portion of said channel (21) is of a depth decreasing towards said output (24).

17. A device as claimed in claim 9, characterized in that said screw lifting member (48) comprises at least a helical thread (20) defining at least an outer helical channel (21) which is engaged by said packets (2); said channel (21) comprising an input portion located at said input (23) and having an end surface winding about said axis (17).

18. A device as claimed in claim 9, characterized in that said screw lifting member (18; 43; 48) comprises a screw (18; 43; 48) having at least a helical thread (20) defining at least an outer helical channel (21) which is engaged by said packets (2); the screw (18; 43; 48) being defined at the bottom by a flat surface (50) coplanar with said input conveying means (3); and said thread (20) terminating at said flat surface (50) with a loading portion (20*a*) for successively engaging said packets (2) as the packets (2) are fed by said input conveying means (3) towards said input (23).

\* \* \* \* \*